Feb. 4, 1969 T. J. RADCLIFFE ET AL 3,426,191
DETECTOR OF STOPPED OR PASSING VEHICLES
Original Filed Sept. 12, 1961 Sheet 1 of 2

INVENTORS
THOMAS J. RADCLIFFE
DANIEL M. McELHANEY, JR.
BY DANIEL F. HAVEL

H. H. Woodlief
ATTORNEY

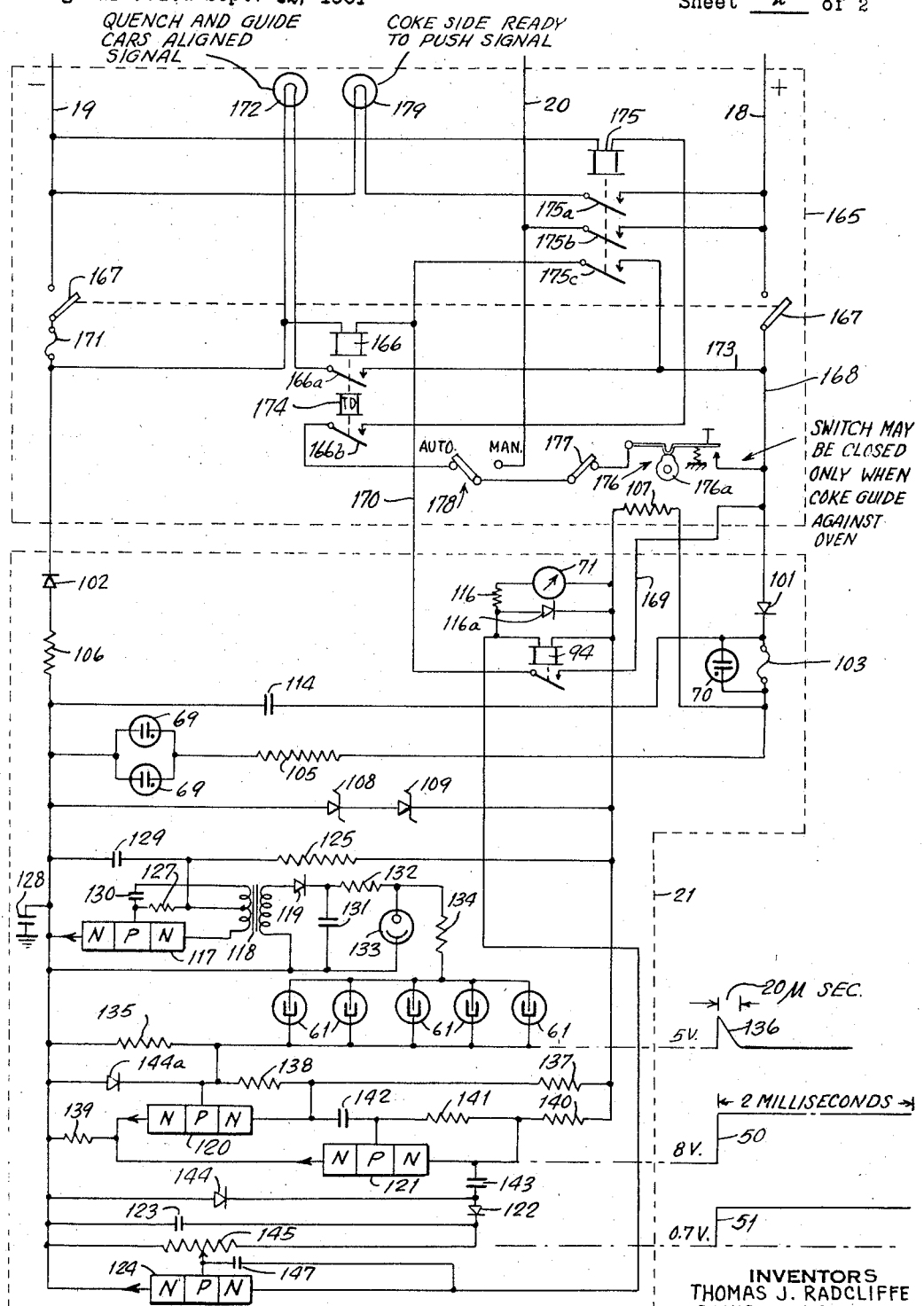

United States Patent Office 3,426,191
Patented Feb. 4, 1969

3,426,191
DETECTOR OF STOPPED OR PASSING VEHICLES
Thomas J. Radcliffe, Warrensville Heights, Daniel M. McElhaney, Jr., Euclid, and Daniel F. Havel, Cleveland, Ohio, assignors to Republic Steel Corporation, Cleveland, Ohio, a corporation of New Jersey
Original application Sept. 12, 1961, Ser. No. 137,588, now Patent No. 3,304,241. Divided and this application July 7, 1966, Ser. No. 563,471
U.S. Cl. 246—167  1 Claim
Int. Cl. B60k *1/10;* H01h *47/04*

The present application is a division of our copending application Ser. No. 137,588, filed Sept. 12, 1961, now Patent No. 3,304,241, entitled, "Safety Control Apparatus for Coke Oven Batteries."

There is disclosed in our parent application safety control apparatus useful in situations where the atmosphere is smoky or foggy, such as in the vicinity of coke oven batteries. That apparatus includes holders for sources of radioactive material which are capable of directing collimated beams of radioactive rays toward appropriate ray detectors. The source holder and dector may be separated by a considerable distance and that distance may include a region subject to dense smoke and/or vapor conditions. The source and the detector are utilized to communicate to the detector the existence of certain conditions at the source.

The source holder may be mounted on a vehicle. The detector is then mounted along the side of a track along which the vehicle moves, and the impingement of the beam of rays on the detector is utilized as an indication of the presence of the vehicle. Alternatively, the detector may be mounted on the vehicle and the source holder at the wayside.

An object of the invention is to provide improved means for detecting the position of a vehicle.

A further object is to provide vehicle detection apparatus including two cooperating elements, one of which is a source of a beam of radioactive rays, the other element being a detector of such a beam, with one of the two elements mounted on the vehicle and the other positioned along the wayside of the vehicle path.

A further object is to provide vehicle detection apparatus of the type described which distinguishes between means for detecting the position of a vehicle.

The foregoing and other objects are attained in the apparatus described herein.

A radioactive source is mounted on the roof of a quench car locomotive and a detector is mounted on the roof of a cooperating guide car on a parallel track. The roof mounting keeps the beam of radiation out of the normal paths of movement of operating personnel. The source on the quench car is provided with a universal mounting so that the direction of its beam may be adjusted and aimed at the detector mounted on the guide car. In order that a signal may not be given accidentally when the quench car locomotive happens to be passing the guide car, a relay in the system is provided with a time delay so that the detector on the guide car must detect a beam of radioactive energy for a predetermined period, e.g., a few seconds, so that the signal is not given until the quench car is fully stopped in alignment with the oven to be pushed.

In a modification of the invention, the pusher car is provided with a source of radioactive rays, and its position is detected by means of a plurality of detectors, one associated with each coke oven of the battery. The position of the coke car with respect to the ovens is detected by a similar arrangement.

Other objects and advantages of the invention will become apparent from a consideration of the following specification and claims, taken together with the accompanying drawings.

In the drawings:

FIG. 2 is a wiring diagram of the circuit for the detector mounted on the guide car.

FIG. 1

Figure 1:
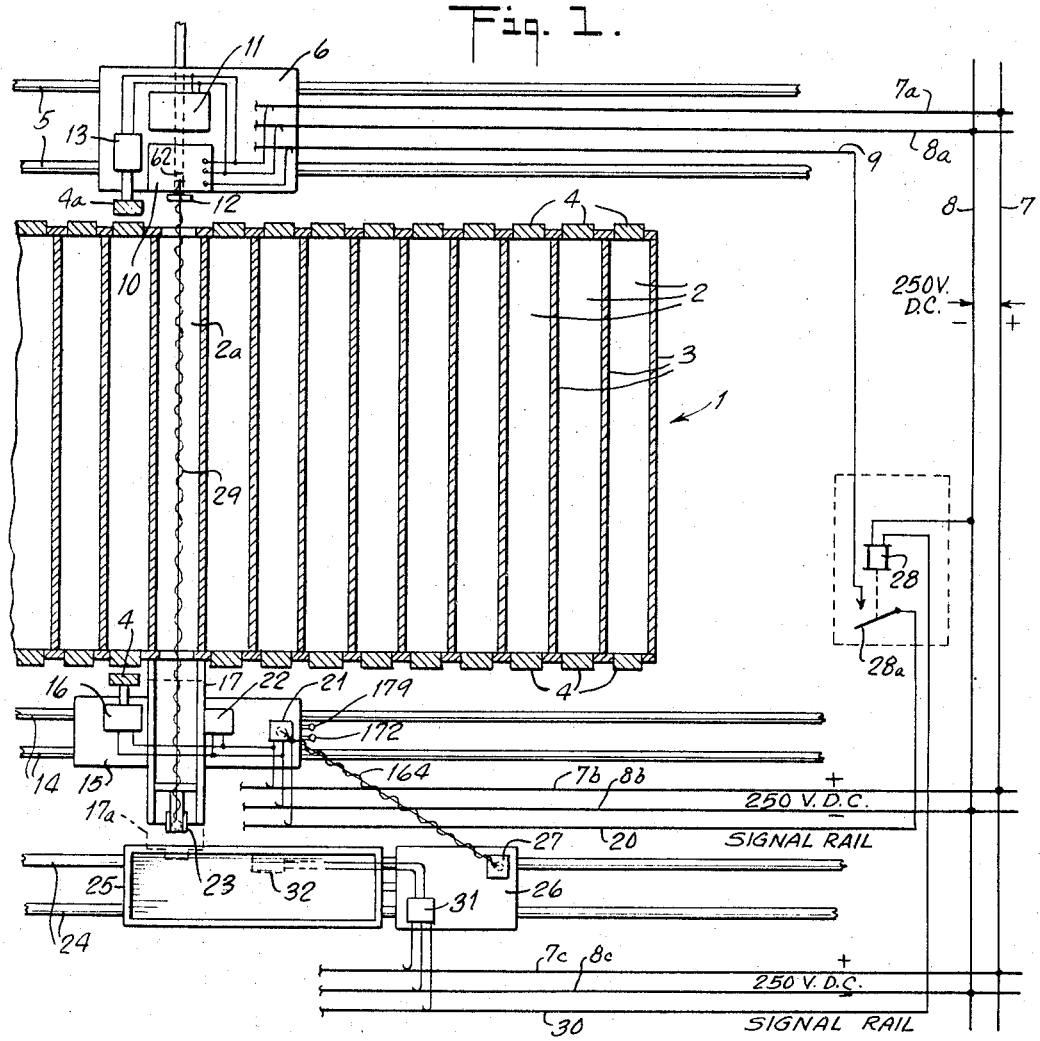
FIG. 1 is a somewhat diagrammatic plan view of a coke oven battery provided with safety control apparatus embodying the invention.

FIG. 1 shows a coke oven battery generally indicated at 1, consisting of a plurality of ovens 2, separated by refractory brick walls 3. Each oven is provided at its opposite ends with removable doors 4, which may be of any suitable construction, many of which are well known.

The upper side of the coke oven battery 1, as it appears in FIG. 1, is the pusher side. Along that side of battery is provided a pair of rails 5 on which runs a pusher car 6, usually electrically powered through a pair of overhead conductors 7a, 8a, commonly termed "power rails." The track 5 is also provided with another overhead conductor 9 commonly termed a signal rail. Electricity is conducted from the power rail 7a and 8a and the signal rail 9 through suitable trolleys and wires to a detector unit 10 illustrated diagrammatically in FIG. 1. Power is also supplied from the rails 7a and 8a to a motor control unit 11 which controls a motor driving a pusher ram 12. Power is also supplied from the rails 7 and 8 to a door machine 13, which may be of conventional construction and which may be operated to engage any of the doors 4 and remove it outwardly away from the oven.

The apparatus is shown in the drawings with the parts in the positions which they take up after the door machine 13 has removed the door 4, from a particular oven 2a and has moved it outwardly, and the pusher car 6 has moved to the left along the rails 5 to bring the pusher ram 12 into alignment with the open oven 2a.

The lower side of the oven as viewed in FIG. 1, is the coke side of the oven battery. Along the coke side is a pair of rails 14 on which runs a guide car 15. The guide car carries a door machine 16, which may be of conventional construction, similar to the door machine 13. The guide car 15 also carries a coke guide 17 which is movable from the guiding position shown in full lines in the drawing, where its upper end abuts the wall of the coke oven, outwardly (or downwardly as it appears in the drawing) to a dotted line position 17a, where the coke guide is free to travel along the oven with the guide car 15.

A coke guide of the type described, which moves laterally to the guide car 15 between guiding and traveling positions, is known as a "racking" guide. Some coke oven batteries use a "non-racking" guide, which does not move laterally of the guide car. A non-racking guide leaves an open space between the end of the oven and the walls and floor of the guide. This open space at the floor is commonly closed by a hinged plate, termed a "flopper plate," when an oven is being pushed. No attempt is made to close the space between the side walls of the guide and the oven. Consequently, a pushing operation with a non-racking guide results in a substantially greater spillage of coke than an operation with a racking guide.

The track 14 is provided with a pair of power supply rails 7b, 8b and a signal rail 20. The rails 7b, 8b and 20 are connected through suitable trolleys and wires to detector unit 21 mounted on the roof of the guide car. Power from the rails 7b and 8b is also supplied through suitable wires to a coke guide drive motor 22 and to the door machine 16, as well as to the propulsion motors of the guide car (not shown).

Mounted on the outer end of the guide 17 is a source 23 of radioactive material. The source 23 cooperates with the detector 10 on the pusher car 6 when the guide 17 is aligned with the pusher 12, and both the doors 4 have been removed from the oven between them.

Alongside the tracks 14 and at a lower level is another pair of tracks 24 along which moves a quench car 25 propelled by the quench car locomotive 26. Mounted on the roof of the quench car locomotive is another source 27 of radioactive material which cooperates with the detector 21 mounted on the guide car. The tracks 24 are provided with a pair of power rails 7c, 8c and with a signal rail 30. The rails 7c, 8c and 30 are connected through suitable trolleys and wires to a control unit 31 on the quench car locomotive, which is in turn connected through wires to a discharge door detector unit 32 mounted on the quench car. The power rails 7a and 8a, 7b and 8b and 7c and 8c are connected to common supply busses 7, 8, usually at 250 volts direct current. The signal rail 30 is shown as being connected through the winding of a relay 28 to the negative power supply line 8. Signal rail 20 is connected through contact 28a of relay 28 to the signal rail 9.

FIG. 2

The detector unit 21 shown diagrammatically in FIG. 1, mounted on the guide car roof, is illustrated in the wiring diagram of FIG. 2.

The shape of the casing in which the detector unit 21 is mounted is not critical. Typically it will be in a casing with rectangular sides. The Geiger tubes 61 may be greater in number than those shown. Preferably they should be arrayed along a line parallel to the direction of movement of the quench car locomotive and with due regard to the spread of the beam of radiation after it leaves its source so that the detector unit Geiger tubes will be impinged on by radiation if the quench car locomotive is within a distance of plus or minus one foot from a given position along the track 24.

The circuits in the detector unit 21 are completely described in our parent application, Ser. No. 137,588, mentioned above. Briefly, the unit 21 includes a plurality of Geiger tubes 61, supplied with high potential unidirectional electrical energy through a power supply circuit including elements 117, 118, 119, 125, 127, 128, 129, 131, 132, 133 and 134. When a beam of radioactive rays impinges on any one of the Geiger tubes, it conducts and produces an output pulse of approximately the form shown at 136, appearing as a potential across resistor 135.

This potential pulse trips a monostable multivibrator including elements 120, 121, 137, 138, 139, 141, 142, producing an output signal 50 having the form of a square wave of much longer duration. The signal 50 is fed through a coupling capacitor 143 to an integrating circuit 122, 123. A portion of the integrated signal 51 on capacitor 123 is fed to an amplifier 124, 145, 147, whose output is supplied to the relay 94. The relay 94 detector unit 21 has a single contact connected to a control unit 165 (FIG. 2). The control unit 165 may be located inside the cab of the coke guide car.

The contact of relay 94 controls an energizing circuit for a relay 166, located in the control unit 165. This circuit may be traced from the positive power supply line 18 through one pole of a manually operable switch 167 and thence through wires 168 and 169, the contact of relay 94, wire 170, the winding of relay 166 and thence through fuse 171 and the other pole of switch 167 to the negative power supply line 19.

Relay 166 operates a contact 166a which controls an energizing circuit for a signal lamp 172. This energizing circuit may be traced from wire 168 through a wire 173, contact 166a, lamp 172, fuse 171 and switch 167 to the negative power line 19.

Relay 166 also controls, through a time delay mechanism schematically indicated at 174, a contact 166b connected to the circuit for energizing a repeater relay 175. This circuit may be traced from wire 168 through a switch 176, a normally closed manual switch 177, a single pole-double throw switch 178, the contact 166b, the winding of relay 175 and thence to the negative power supply line 19. A cam 176a driven by the motor which moves the coke guide 17 prevents movement of switch 176 to its closed position unless the guide is in its guiding position. When the cam 176a permits, switch 176 may be manually closed. Alternatively, the cam 176a may operate the switch 176, in which case the cam may be so constructed that the switch 176 is closed only when coke guide 17 is against the face of the oven. The switch 178 is normally in its left-hand or automatic position as shown in the drawing.

The relay 175 operates a contact 175a which controls an obvious circuit for energizing a signal lamp 179, which is conveniently placed alongside the signal lamp 172. Relay 175 also controls a contact 175b. When relay 175 is energized, contact 175b closes, connecting the positive power supply potential to the signal rail 20. Relay 175 also controls a contact 175c. When relay 175 is energized, contact 175c closes, completing a holding circuit for relay 166. This circuit may be traced from wire 168 through wire 173, contact 175c and the winding of relay 166 to the negative supply line.

The signal lamps 172 and 179 are preferably located, as shown in FIG. 1, outside the cab of the coke guide car 15 in the position where they are readily visible to the operator of the quench car locomotive 26.

The term "control element" as used in this specification is intended as a generic term inclusive of a member [e.g., contact 166b] movable between an inactive position and an active position and an electrical device [e.g., winding of relay 175 or the lamp 179] shiftable between an inactive deenergized position and an active energized position. In all cases, the inactive position is readily accessible from the active position, as is necessary for safety.

OPERATION OF FIG. 2

After the guide car 15 is aligned with an oven, the quench car locomotive operator may then drive his locomotive so as to bring the quench car 25 into alignment with the coke guide 17. When the condition of alignment is reached, the source of radioactive material in the source holder 27 directs its beam at the detector 21 on the guide car, which responds by energizing relay 166 and lights the signal lamp 172. The lighting of the signal lamp 172 informs the quench car locomotive operator that the quench car is in the proper position to receive coke from the coke guide. Since the quench car is moving when the beam impinges on the detector 21, and the signal lamp remains lit only during a travel of about two feet (plus or minus one foot from a given position), the detector must act rapidly to give the operator time to stop the car after he sees the signal light up, and before the car overshoots the two foot range. In some cases, it may be desirable to omit or modify the capacitance of the capacitor 147, to further speed the operation of the relay 94.

The signal rail 20 is not energized until the quench car has remained in that position for a time determined by the characteristics of time delay mechanism 174 and also is not energized until the coke guide 17 has moved into its guiding position, thereby closing the switch 176.

The time delay mechanism 174 protects against unintentional energization of the signal rail 20 which might otherwise occur when the quench car was being driven past the location of the guide car 15, without any intention on the part of the quench car locomotive operator to stop the quench car in alignment with the guide car. The time delay insures that the quench car is actually stopped in alignment with the coke guide, and is not merely passing. As soon as the time delay has passed, the signal 179 is illuminated, telling the quench car locomotive operator that the signal rail 20 has been energized and that the relay 166 is locked in, and its energization is no longer dependent on the maintenance of the quench car locomotive in its aligned position. The quench car locomotive normally moves during the pushing of coke from the oven, so as to distribute the load of coke along the length of the quench car. The lighting of the signal lamp 179 informs the quench car operator that he is free to proceed with such movement of the quench car as may be required during the pushing operation.

After the pushing operation is completed, the movement of the coke guide away from the oven opens the switch 176, deenergizing relay 175 and opening the holding circuit for relay 166, so that the circuit is reset and ready to respond to a new energization of relay 94.

Where the interlocking system described is used with a non-racking coke guide, there is, of course, no movement of the guide available to actuate the switch 176. In that situation, the reset switch may be operated manually. An alternative is to actuate the switch to its open position when the flopper plate is retracted. Another alternative is to open the switch whenever the traction motor of the guide car is energized. Still other operating functions may be chosen to trip the reset switch, as long as the function which trips it is one which occurs after each pushing of an oven.

In case of a power failure or other malfunctioning in the detector unit 21, the switch 178 can be thrown to the manual position, so that switch 177 is directly connected to the signal rail 20. When switch 178 is in the manual position, the supply of power to the signal rail 20 is manually controlled by switch 177, which may be operated by the operator in the coke guide car 15.

The switch 167 is provided to deenergize the detector unit 21, in case it is required to repair that unit.

FIG. 3

This figure diagrammatically illustrates a somewhat different layout of the detector apparatus from that employed in FIG. 1. In this case, each oven is provided with a pusher car detector 201. The several detectors 201 cooperate with a single radioactive source 202 mounted on the pusher car. Similarly, each oven is provided with a quench car detector 203 cooperating with a source 204 mounted on the quench car 25. Alternatively, it could be mounted on locomotive 26, providing each detector 203 were offset laterally from the oven it protects by a distance equal to the spacing between the qeunch car and its locomotive. Another source 207 mounted on the guide car cooperates with a detector 208 mounted on the quench car locomotive. Alternatively, the detector 208 could be mounted on the quench car, provided it is adequately protected from the hot coke. The circuit in the pusher car may control the pusher motor in a manner generally similar to the circuits described in our parent application Ser. No. 137,588, mentioned above. For example, the detector 208 may, upon impingement of a beam from source 207, open a shutter or otherwise release a beam of rays from souce 204 directed toward one of the detectors 203. When the detector 203 and the detector 201 on the same oven are both actuated, then a distance equal to the spacing between the quench car cab. The source 207 on the guide car should have a shutter interlocked with the coke guide so that the shutter is opened only when the guide is in its guiding position. Since the guide can move to its guiding position only after the oven door is removed, the opening of the shutter checks that the oven door on the coke side of the battery is open. The arrangement is such that a signal is supplied to the pusher car cab only when the pusher car, the quench car and the guide car are all aligned with the same oven, and the door on the coke side oven is open. This signal may be supplied through signal rails and relays in the same manner as outlined in detail above. The arrangement shown in FIG. 3 requires somewhat more equipment, particularly the plurality of detectors 201 and 203, one for each oven, but has the advantage that it does not require the successful transmission of a beam of radioactive rays through the top of the oven, where it may be blocked by the coke being pushed, carbon deposits on the oven roof, etc.

Figure 3:
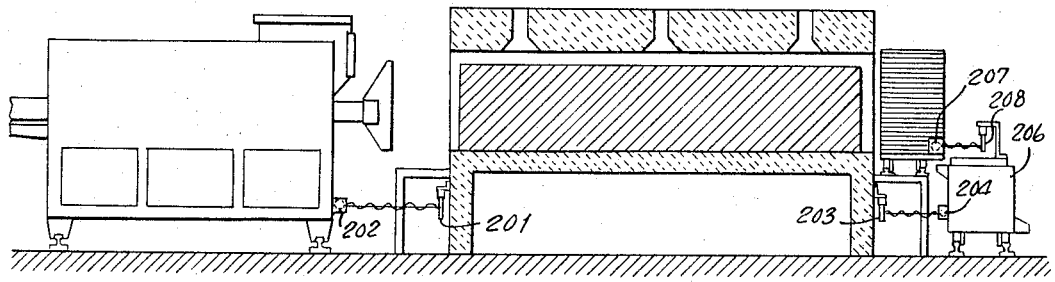
FIG. 3 is a somewhat diagrammatic cross-sectional view of a coke oven battery, illustrating a modified form of interlocking safety control apparatus.

The apparatus illustrated in FIG. 3 may be further modified to eliminate the need for a signal rail by mounting a single detector 201 on the pusher car in the location shown for source 202, and mounting a plurality of sources 202 on the fixed parts of the oven, in the location shown for detectors 201. Each detector 203 would then control a shutter on the source 202 of its associated oven. When the pusher car is properly positioned, then the detector 201 signals the pusher car operator and permits energization of the motor circuit for driving the pusher ram forward. Again, the apparatus checks that the pusher car, quench car, and guide car are aligned, and the door on the coke side of the oven is open. The door on the pusher side is, of course, under the direct observation of the pusher car operator, and there is no need for an automatic interlock of that door. Furthermore, if the operator should erroneously move the ram forward before removing the door on the pusher side, the door would stop the ram.

While we have shown and described certain preferred embodiments of our invention, other modifications thereof will readiy occur to those skilled in the art, and we therefore intend our invention to be defined only by the appended claims.

What is claimed is:

1. Apparatus for detecting a vehicle stopped in a given location, and distinguishing it from a passing vehicle, comprising:
    (a) first control mechanism on said vehicle;
    (b) second control mechanism located along the wayside of the path of movement of the vehicle;
    (c) one of said control mechanisms comprising source means for producing a beam of radioactive rays directed transversely to said path; and
    (d) the other of said control mechanisms comprising a detector for said beam of rays and mounted in a position intersected by said beam of rays as the vehicle moves along said path;
  wherein the improvement comprises:
    (e) energizable time delay means in said other control mechanism comprising:
        (1) a control element; and
        (2) means effective after a predetermined time interval of the order of a few seconds following energization of the time delay means to shift the control element from an inactive condition to an active condition;
    (f) electric circuit means energized in response to detection of a beam of rays by the detector to initiate energization of the time delay means; and
    (g) holding means responsive to shifting of the control element to its active condition to continue the energization of the electric circuit means without regard to the continued detection of the beam by the detector,
    (h) whereby the control element is shifted to its active condition only when the vehicle is stopped with said source means aligned with the detector, so that the beam from the source means impinges on the detector for a time greater than said predetermined interval.

References Cited

UNITED STATES PATENTS

| | | | |
|---|---|---|---|
| 3,114,083 | 12/1963 | Winchel | 317—154 X |
| 3,109,941 | 11/1959 | Winchel | 317—154 X |
| 2,620,435 | 12/1952 | Voget et al. | 246—29 |

OTHER REFERENCES

Shields, "An Integrating Timer," Radio Electronics, December 1960, vol. XXXI, No. 12, pp. 28–29. Copy 317–148.5 TD.

ARTHUR L. LA POINT, *Primary Examiner.*

U.S. Cl. X.R.

246—29; 317—154; 246—122

UNITED STATES PATENT OFFICE
CERTIFICATE OF CORRECTION

Patent No. 3,426,191                                                      February 4, 1969

Thomas J. Radcliffe et al.

It is certified that error appears in the above identified patent and that said Letters Patent are hereby corrected as shown below:

Column 1, line 45, "means for detecting the position of a vehicle." should read -- a passing vehicle and a stopped vehicle. --. Column 5, lines 74 and 75, "distance equal to the spacing between the quench car cab." should read -- signal is supplied through a signal rail to the pusher car cab. --.

Signed and sealed this 7th day of April 1970.

(SEAL)
Attest:

Edward M. Fletcher, Jr.                                       WILLIAM E. SCHUYLER, JR.
Attesting Officer                                                  Commissioner of Patents